(12) United States Patent
Dejardin

(10) Patent No.: US 10,439,669 B2
(45) Date of Patent: Oct. 8, 2019

(54) COEXISTENCE OF RADIO MODULES IN AN ELECTRONIC DEVICE

(71) Applicant: SAGEMCOM BROADBAND SAS, Rueil Malmaison (FR)

(72) Inventor: Romain Dejardin, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/318,152

(22) PCT Filed: Jul. 26, 2017

(86) PCT No.: PCT/EP2017/068848
§ 371 (c)(1),
(2) Date: Jan. 16, 2019

(87) PCT Pub. No.: WO2018/019870
PCT Pub. Date: Feb. 1, 2018

(65) Prior Publication Data
US 2019/0253097 A1 Aug. 15, 2019

(30) Foreign Application Priority Data
Jul. 26, 2016 (FR) ..................................... 16 57169

(51) Int. Cl.
*H04B 1/38* (2015.01)
*H04B 1/40* (2015.01)
(Continued)

(52) U.S. Cl.
CPC ............. *H04B 1/40* (2013.01); *H04B 1/0475* (2013.01); *H04B 1/1027* (2013.01)

(58) Field of Classification Search
CPC ...... H04B 1/40; H04B 1/0475; H04B 1/1027; H04B 1/406; H04B 1/109; H04B 15/02;
(Continued)

(56) References Cited

U.S. PATENT DOCUMENTS 7,292,830 B1 * 11/2007 Cheung ................ H04B 17/345
375/345
7,606,575 B2 * 10/2009 Mahany .................. G06F 1/163
455/452.2

(Continued)

FOREIGN PATENT DOCUMENTS

EP        1 710 920 A1    10/2006

OTHER PUBLICATIONS

Oct. 18, 2017 Search Report issued in International Patent Application No. PCT/EP2017/068848.

*Primary Examiner* — April G Gonzales
(74) *Attorney, Agent, or Firm* — Oliff PLC; R. Brian Drozd

(57) ABSTRACT

Disclosed is an electronic device that includes first and second radio modules using the same radio frequency band. The electronic device includes a first and second programmable radio attenuator and is arranged for: (1) determining a value of attenuation associated with each radio module according to a maximum power acceptable to the radio module, a transmission power of the other radio module and isolation between the first and second radio interfaces, (2) determining, for each radio module, a value of a quality indicator of a communication established with said radio module, and, when, for a radio module, the value of the quality indicator is higher than a predetermined threshold value that's dependent on the value of the attenuation associated with the radio module and a minimum power acceptable to the radio module, and (3) programming the
(Continued)

radio attenuator corresponding to the value of the attenuation associated with the radio module.

11 Claims, 3 Drawing Sheets

(51) Int. Cl.
*H04B 1/10* (2006.01)
*H04B 1/04* (2006.01)

(58) Field of Classification Search
CPC ...... H04B 15/04; H04B 52/24; H04B 52/241; H04B 52/243; H04B 52/245; H04W 88/06; H04W 72/1215; H04W 72/1226; H04W 72/1231
USPC ........................................................ 455/73
See application file for complete search history.

(56) References Cited

U.S. PATENT DOCUMENTS

| | | | | |
|---|---|---|---|---|
| 7,929,650 B2* | 4/2011 | Sobchak | ............. | H04L 27/3809 375/345 |
| 8,599,709 B2* | 12/2013 | Chen | ..................... | H04W 28/18 370/252 |
| 8,836,601 B2* | 9/2014 | Sanford | ................. | H01Q 1/525 343/837 |
| 8,995,553 B2* | 3/2015 | Chen | ..................... | H04L 5/0064 375/267 |
| 9,094,835 B2* | 7/2015 | Persson | ................. | H04W 76/36 |
| 9,094,999 B2* | 7/2015 | Jechoux | ................. | H04W 88/06 |
| 9,240,835 B2* | 1/2016 | Berlin | .................. | H04B 7/2606 |
| 9,397,820 B2* | 7/2016 | Schulz | ...................... | H04L 5/14 |
| 9,497,797 B2* | 11/2016 | Deparis | ................. | H04W 88/06 |
| 9,516,698 B2* | 12/2016 | Schmandt | ............. | H04W 88/06 |
| 9,543,635 B2* | 1/2017 | Schulz | .................... | H01Q 19/12 |
| 9,673,904 B2* | 6/2017 | Palanisamy | ...... | H04B 10/25759 |
| 9,781,701 B2* | 10/2017 | Jechoux | ................. | H04W 72/02 |
| 10,034,329 B2* | 7/2018 | Jechoux | ................. | H04W 84/12 |
| 10,128,951 B2* | 11/2018 | Casterline | ........ | H04B 10/25754 |
| 2003/0086398 A1* | 5/2003 | Hiltunen | ............. | H04B 1/109 370/335 |
| 2005/0221765 A1* | 10/2005 | Shen | ...................... | H04B 17/14 455/73 |
| 2007/0159994 A1* | 7/2007 | Brown | .............. | H04W 52/0216 370/324 |
| 2009/0042527 A1* | 2/2009 | Niknejad | ............. | H04B 1/1027 455/234.2 |
| 2009/0323652 A1* | 12/2009 | Chen | ..................... | H04B 1/406 370/338 |
| 2011/0263214 A1* | 10/2011 | Robinson | ............... | H04B 1/006 455/88 |
| 2015/0009902 A1* | 1/2015 | Emmanuel | .......... | H04W 52/283 370/329 |
| 2016/0294425 A1* | 10/2016 | Hwang | ................. | H04B 1/525 |

* cited by examiner

COEXISTENCE OF RADIO MODULES IN AN ELECTRONIC DEVICE

The present invention relates to the field of radio-frequency communications, and more particularly the field of the coexistence of radio-frequency communication modules using the same frequency band in an electronic device.

Electronic devices have at the present time a greater and greater tendency to incorporate a plurality of radio-frequency (hereinafter "radio") technologies, possibly conforming to various standards, but able to use the same frequency band. This poses several problems. First of all, problems of interference between the various radio technologies used may occur. This is because the radio transmissions of a first radio-frequency transceiver module (hereinafter "radio module") may interfere with the communications established by a second radio module, and vice versa. Next, a problem of so-called "dazzling" of one radio module by another may occur. This is because the transmission of a radio signal by the first radio module may cause saturation at the input of the radio interface of the second radio module. These two problems are conventionally solved by providing isolation between the two radio modules, isolation requiring significant physical separation, of around one wavelength. Thus, for radio modules using a so-called ISM (Industrial, Scientific and Medical) frequency band around 2.4 GHz (that is to say a wavelength of 12.5 cm), the order of magnitude of the physical separation necessary between two radio modules is at least several centimeters. It is however not always possible to guarantee such isolation, in particular for radio modules integrated in electronic devices with a low shape factor, such as connected watches, or ones sharing the same radio antenna.

It is consequently desirable to overcome these drawbacks of the prior art.

The invention relates to an electronic device comprising first and second radio modules using the same radio frequency band and comprising respectively a first and second radio interface, the electronic device comprising a first and second programmable-gain radio attenuator placed respectively on the first and second radio interfaces, the electronic device being arranged for determining, for each radio module, a value of an attenuation associated with said radio module, the value of the attenuation being determined according to a maximum power acceptable to said radio module, a transmission power of the other radio module and isolation between the first and second radio interfaces, determining, for each radio module, a value of a quality indicator of a communication established with said radio module and, when, for a radio module, the value of the quality indicator is higher than a predetermined threshold value, the predetermined threshold value being dependent on the value of the attenuation associated with the radio module and a minimum power acceptable to the radio module, programming the gain of the radio attenuator placed on the interface of the radio module, the gain being chosen equal to the value of the attenuation associated with the radio module.

Advantageously, the electronic device comprises programmable-gain radio attenuators in front of the various radio interfaces of the radio modules. An attenuation is calculated, the attenuation being calculated so as to prevent a radio signal transmitted by a first radio module being able to dazzle the radio interface of a second radio module. In other words, the attenuation is calculated so that the power of a radio signal received by the radio interface of the first radio module is lower than the maximum power acceptable to said radio module. The calculation takes account of isolation existing between the radio interfaces of the modules. Thus the value of the attenuation necessary depends on the power of the radio signal transmitted by the first radio module, the maximum power acceptable to the second radio module and the isolation between the two radio modules. Once a value of the attenuation necessary for preventing dazzling of a radio module is known, a quality indicator of a communication established with said radio module is determined. If this quality indicator of the communication, minus the attenuation value, still makes it possible to maintain a communication, then the gain of the radio attenuator is programmed with this determined value of the attenuation. In other words, if the power of a radio signal received, indicated by the quality indicator, and minus the value of the attenuation calculated, still makes it possible to maintain a received signal power higher than the minimum power acceptable to the radio module, then it is possible to programme the gain of the radio attenuator with the value of the attenuation calculated. The radio signal received corresponds to the radio signal transmitted by an electronic device with which the communication is established. Thus it is possible to maintain the communication established with the first radio module while preventing any phenomenon of dazzling by the transmission of a radio signal by the second radio module. The two radio modules can therefore cohabit without one radio module dazzling the other radio module in the event of transmission. Each radio module can therefore preserve its temporal particularities of access to the frequency band, that is to say transmit or receive without having to synchronise with the other radio module, and thus keep its entire potential of transmission rate or bandwidth for the radio communications established with other electronic devices.

According to a complementary embodiment of the invention, the electronic device is arranged, when, for each radio module, the value of the quality indicator is higher than the predetermined threshold value, for determining the radio module having the highest value of the quality indicator of an established communication and for programming the gain of the radio attenuator of said radio module.

Advantageously, when, for each radio module, a quality indicator of a communication established is higher than the predetermined threshold value, only the gain of the radio attenuator placed on the radio interface of the radio module having the highest value of the quality indicator is programmed. Thus the attenuation is minimum for the other radio module, while preventing any risk of dazzling between the two radio modules. The interference with the quality of the communications established is thus minimum while keeping the advantage of preventing any dazzling between radio modules.

According to a complementary embodiment of the invention, the electronic device is further arranged for determining, for a radio module, a first list comprising at least one radio channel included in the frequency band, said radio module using only a channel included in this first list for establishing a radio communication and, for the other radio module, determining a second list comprising at least one radio channel included in the frequency band and not included in the first list, said other radio module using solely a channel included in this second list for establishing a radio communication.

Advantageously, before implementing a method preventing dazzlings between radio modules, the bandwidth is shared between the two radio modules in order to limit the interference between radio modules. The bandwidth available, used by the two radio modules, being conventionally subdivided into various channels, the first radio module determines a first list of channels used for its communication requirements. The second radio module then uses for its own requirements a second list of channels, the second list not comprising channels present in the first list. In other words, the two radio modules do not use the same channels available for communicating, reducing the interference in the event of simultaneous transmission and reception.

According to a complementary embodiment of the invention, the electronic device is arranged, when, for each radio module, the value of the quality indicator is lower than the predetermined threshold value, for synchronising the first and second radio modules so that the first and second radio modules are in reception or transmission phase at the same time.

When the values of the quality indicators of the communications established do not make it possible to programme the gain of the radio attenuators at the attenuation value necessary for preventing dazzling between the radio modules, then the first and second radio modules are synchronised in reception phase or in transmission phase. Thus, if the two radio modules transmit or receive at the same time, the phenomenon of dazzling of one radio module by another cannot take place.

According to a complementary embodiment of the invention, the electronic device comprises a radio splitter comprising an input connected to an antenna and two outputs connected respectively to the first and second programmable-gain radio attenuators.

Advantageously, the first radio module and the second radio module share the same antenna in order to reduce manufacturing costs and the size of the electronic device. The two radio modules are then connected to the antenna by means of a splitter. The isolation between the first radio interface and the second radio interface then depends on the splitter.

According to a complementary embodiment of the invention, the electronic device comprises first and second antennas, the first and respectively second programmable-gain radio attenuators placed on the first and respectively second radio interfaces being connected to the first and respectively second antennas.

Advantageously, each radio module is connected to an antenna. The isolation between the two antennas can then be optimised.

According to a complementary embodiment of the invention, the first radio module is in conformity with a Bluetooth standard and the second radio module is in conformity with a Zigbee standard.

Advantageously, the electronic device comprises a radio module in conformity with a Bluetooth standard and a radio module in conformity with a Zigbee standard.

The invention also relates to a method allowing the coexistence of first and second radio modules using the same frequency band in an electronic device, the first and second radio modules comprising respectively a first and second radio interface, the electronic device comprising a first and second programmable-gain radio attenuator placed respectively on the first and second radio interfaces, the electronic device comprising a processor, the method being executed by the processor and comprising the following steps: determining, for each radio module, a value of an attenuation associated with said radio module, the value of the attenuation being determined according to a maximum power acceptable to said radio module, a maximum transmission power of the other radio module and an isolation between the first and second radio interfaces, determining, for each radio module, a value of a quality indicator of a communication established with said radio module and, when, for a radio module, the value of the quality indicator is higher than a predetermined threshold value, the predetermined threshold value being dependent on the value of the attenuation associated with the radio module and a minimum power acceptable to the radio module, programming the gain of the radio attenuator placed on the interface of the radio module, the gain being chosen equal to the attenuation value associated with the radio module.

According to one embodiment of the invention, the method comprises the following prior steps: determining, for a radio module, a first list comprising at least one radio channel included in the frequency band, said radio module using solely a channel included in this first list for establishing a radio communication and, for the other radio module, determining a second list comprising at least one radio channel included in the frequency band and not included in the first list, said other radio module using solely a channel included in this second list for establishing a radio communication.

The invention also relates to a computer program that can be stored on a medium and/or downloaded from a communication network, in order to be read by a processor. This computer program comprises instructions for implementing all or some of the steps mentioned below, when said program is executed by the processor. The invention also relates to an information storage medium comprising such a computer program.

The features of the invention mentioned above, as well as others, will emerge more clearly from a reading of the following description of an example embodiment, said description being given in relation to the accompanying drawings, among which:

Figure 1:
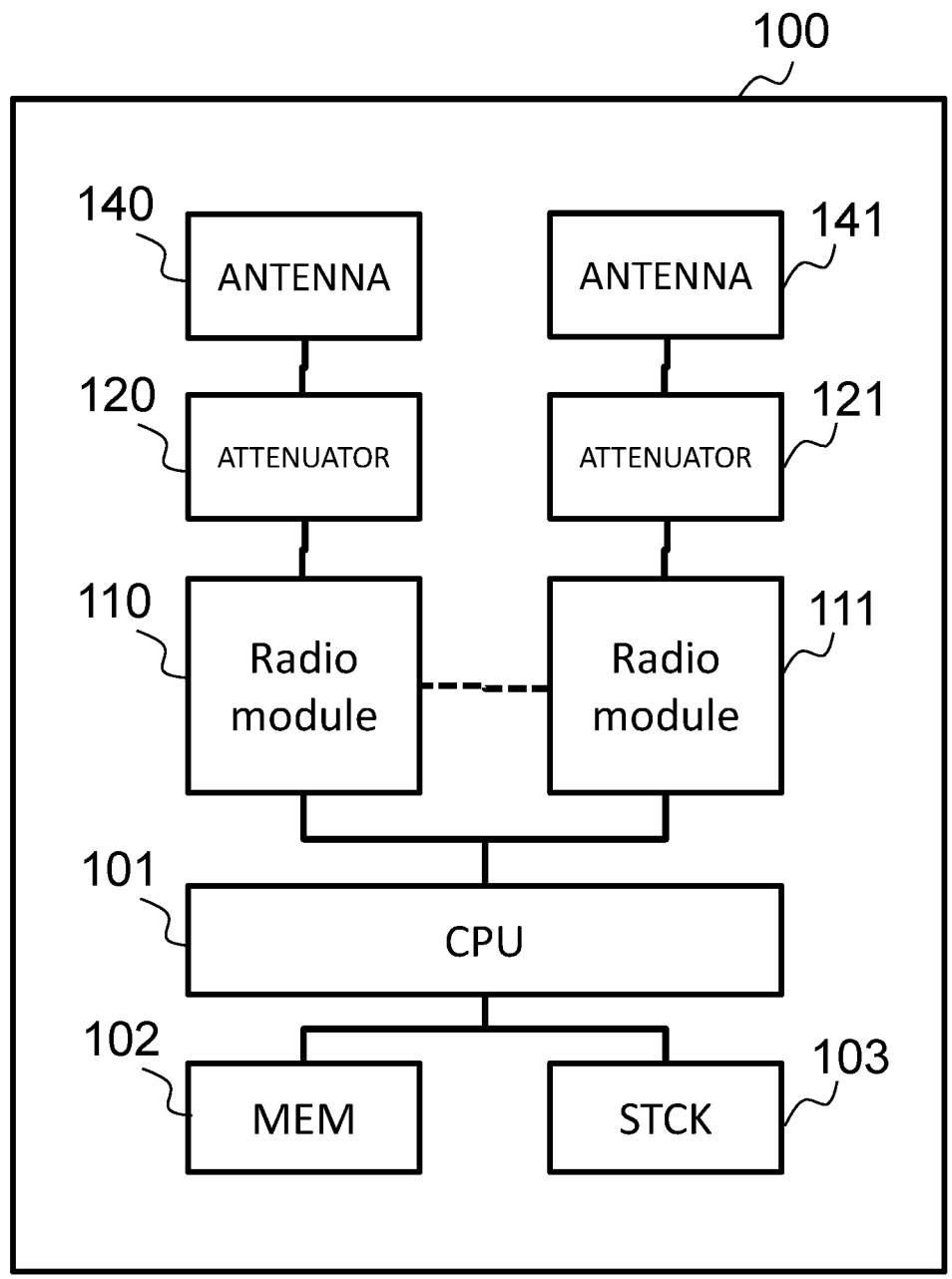
FIG. 1 illustrates schematically an electronic device comprising a first radio module and a second radio module coexisting in the same electronic device according to one embodiment of the invention, each radio module being connected to an antenna.

FIG. 1 illustrates schematically an electronic device 100 comprising a first radio module 110 and a second radio module 111, the first radio module 110 being connected to an antenna 140 and the second radio module 111 being connected to the antenna 141. More precisely, a programmable-gain radio attenuator 120 (hereinafter "radio attenuator") is placed on a radio interface of the first radio module 110, the radio attenuator 120 being connected to the antenna 140. The radio attenuator 120 is therefore disposed between the radio module 110 and the antenna 140. The radio attenuator 121 is disposed in a similar manner between the second radio module 111 and the antenna 141. A programmable-gain radio attenuator such as the radio attenuator 120 or 121 is a device making it possible to reduce—or attenuate—the power of a radio signal. In other words, a radio attenuator makes it possible to receive as an input a radio signal of a certain power and to deliver the radio signal as an output with a reduced power. The reduction—or attenuation—of the power is programmable, the gain corresponding to the attenuation applied to the radio signal. Typically, the gain or attenuation that a radio attenuator can apply is measured in dB (decibels) and a programmable-gain radio attenuator makes it possible to obtain an attenuation varying between 0 dB (that is to say no attenuation) and several tens of dB. The radio attenuators 120 and 121 are bidirectional, that is to say they make it possible to apply the same attenuation indifferently to a radio signal coming from the antenna 140 or 141 and intended for the radio module 110 or 111, or conversely to a radio signal transmitted by the radio module 110 or 111 and intended for the antenna 140 or 141. In other words, any radio signal received by an antenna 140 or 141 and transmitted to a radio module 110 or 111, or transmitted by a radio module 110 or 111 intended for an antenna 140 or 141, undergoes attenuation of its power by passing through a radio attenuator 120 or 121, the attenuation corresponding to the programmable gain of the radio attenuator 120 or 121. The isolation between the radio interfaces of the radio modules 110 and 111 is a value typically expressed in dB (decibels). The isolation represents the attenuation of a signal transmitted by one radio interface and received by the other radio interface. An ideal isolation is around 40 dB or greater, that is to say any radio signal transmitted by one of the radio modules would be received by the other radio module with an attenuation of 40 dB or more. However, as stated previously, for reasons of size of the electronic device in particular and of the frequency bands used, it is not always possible to design electronic devices comprising two radio modules wherein the radio interfaces are isolated with such an ideal isolation value. The present electronic device can advantageously comprise an isolation between the radio interfaces of the radio modules 110 and 111 of only around a few decibels (dB).

The electronic device 100 comprises, connected by a communication bus: a processor or CPU (central processing unit) 101; a memory MEM 102 of the RAM type (random access memory) and/or ROM type (read only memory) and a storage module STCK 103 of the internal storage type. The electronic device 100 may comprise other modules 104 and/or 105 according to the nature of the electronic device 100. The storage module STCK 103 may be of the hard disk HDD (hard disk drive) type or SSD (solid-state drive) type, or of the external storage medium reader type such as an SD (secure digital) card reader. The processor CPU 101 can record data on the storage module STCK 103 or read data recorded on the storage module STCK 103. These data may correspond to configuration parameters for the electronic device 100 or to information received for example in a message received by one of the radio modules 110 or 111, or via another communication module. The radio modules 110 and 111 may be in conformity with a Wi-Fi™ (Wireless Fidelity), Bluetooth™, Zigbee™ or GPRS (General Packet Radio Service) standard, a third-generation mobile telephony standard (for example Universal Mobile Telecommunications System—UMTS), a fourth-generation mobile telephony standard (for example Long Term Evolution—LTE) or any other mobile telephony standard.

The processor CPU 101 is capable of executing instructions loaded in the memory MEM 102, for example from the storage module STCK 103 or from a communication network via a radio module 110 or 111, or from another communication module. When the electronic device 100 is powered up, the processor CPU 101 is capable of reading instructions from the memory MEM 102 and executing them. These instructions form a computer program causing the implementation, by the processor CPU 101, of all or some of the methods and steps described below. Thus all or some of the methods and steps described below may be implemented in software form by the execution of a set of instructions by a programmable machine, such as a DSP (digital signal processor) or a microcontroller. All or some of the methods and steps described here may also be implemented in hardware form by a machine or a dedicated component, such as an FPGA (field-programmable gate array) or an ASIC (application-specific integrated circuit).

The processor CPU 101 is particularly arranged for determining, for each radio module 110 and 111, an attenuation value associated with said radio module, the value of the attenuation being determined according to a maximum power acceptable to said radio module, a transmission power of the other radio module and the isolation between the first and second radio interfaces. In other words, the processor CPU 101 is arranged for determining a value of the attenuation necessary to be applied at the input of the radio interface of a first radio module so that a radio signal transmitted by the second radio module does not dazzle the radio interface of the first radio module. It is said that a radio signal dazzles the radio interface of a radio module when the radio module receives the radio signal with a power greater than the maximum power acceptable to this radio module. In other words, the power of the radio signal received by the radio module being higher than the maximum acceptable power, a phenomenon of saturation of the radio interface occurs. The attenuation determined by the processor CPU 101, in addition to the isolation existing between the radio modules, corresponds to an attenuation making it possible to prevent the phenomenon of dazzling of one radio module by the other radio module, and vice versa. The processor CPU 101 thus determines a first value of an attenuation associated with the first radio module 110 and a second value of an attenuation associated with the radio module 111.

The processor CPU 101 is arranged for determining, for each radio module 110 and 111, the value of a quality indicator of a communication established with said radio module. This quality indicator of a communication is typically equal to the so-called "LQI" (Link Quality Indicator) parameter as defined by the standard IEEE 802.15.4 (Institute of Electrical and Electronics Engineers), section 6.9.8, or by the standard IEEE 802.15.1, section 7.5.3. The quality indicator of a communication is typically expressed in dBm (or decibel-milliwatts, the ratio of power in decibels between a measured power and a reference power of 1 milliwatt). The quality indicator is particularly related to the quality of reception of a radio signal transmitted to the radio module. In other words, the quality indicator may be associated with a power of a radio signal received by the radio module 110 or the radio module 111. The association between a value of a quality indicator and a power level of a radio signal received by a radio module may require a step of prior calibration of the radio module in the electronic device 100.

The processor CPU 101 is arranged for comparing, for each radio module 110 and 111, the value of the quality indicator previously determined with a predetermined threshold value. The predetermined threshold value, possibly different for each radio module, is dependent on the value of the attenuation associated with the radio module and a minimum power acceptable for this same radio module. In other words, the processor CPU 101 determines, for each radio module 110 and 111, whether the communication established with the radio module 110 or 111 can be attenuated by a value corresponding to the value of the attenuation associated with said radio module without the communication established being cut. This is because it is possible that, with an attenuation, the received power of a radio signal transmitted by an electronic device with which the communication is established then becomes lower than the minimum power acceptable to the radio module. When, for a radio module 110 or 111, the value of the quality indicator is higher than the predetermined threshold value, then the processor CPU 101 can programme the gain of the radio attenuator placed on the interface of the radio module concerned, the gain being chosen equal to the value of the attenuation associated with said radio module. In other words, if it is possible to place an attenuation with a value equal to the attenuation associated with a radio module without cutting an established communication, then the gain of the programmable gain attenuator placed on the interface of the radio module concerned is programmed at said attenuation value. Thus the previously established communication remains established after the establishment of the attenuation, and, at the same time, the radio module is protected from any risk of dazzling by a transmission of a radio signal by the other radio module. The two radio modules 110 and 111 can then coexist in the same electronic device 100 without any risk of dazzling of one radio module by the other.

Figure 2:
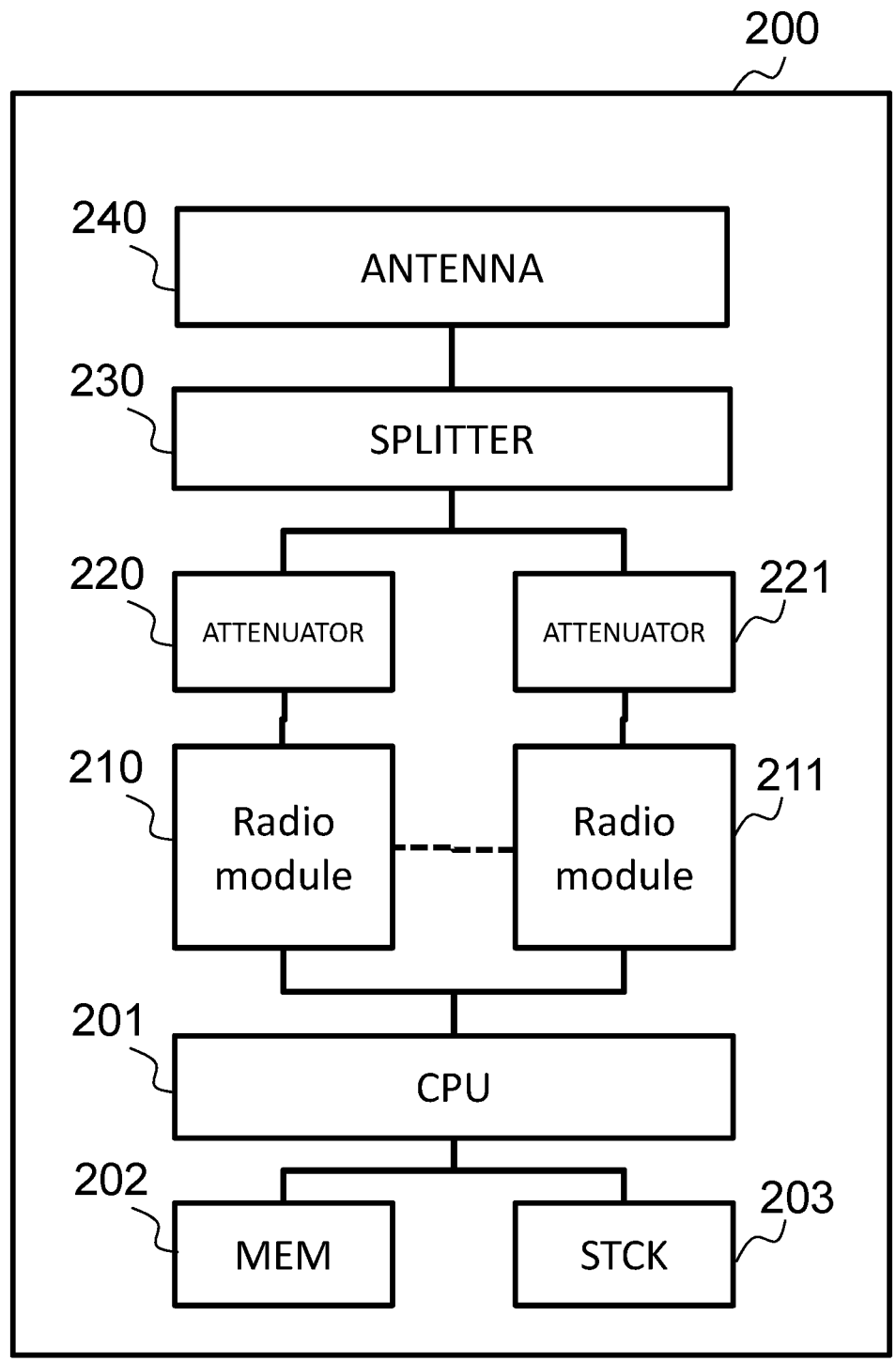
FIG. 2 illustrates schematically an electronic device comprising a first radio module and a second radio module coexisting in the same electronic device according to one embodiment of the invention, the radio modules being connected to the same antenna through a splitter.

FIG. 2 illustrates schematically an electronic device 200 comprising a first radio module 210 and a second radio module 211, the radio modules being connected to the same antenna 240 through a splitter 230. The module 201, and respectively 202, 203, 204, 205, 210, 211, 220 and 221, in FIG. 2 is similar to the module 101, and respectively 102, 103, 104, 105, 110, 111, 120 and 121, in FIG. 1 and previously described. Unlike the electronic device 100, the electronic device 200 comprises only one antenna 240, shared by means of a splitter 230 in order to be used by the radio modules 210 and 211. The isolation between the radio interface of the radio module 210 and the radio interface of the radio module 211 is then mainly determined by the characteristics of the splitter 230. Except for this difference, the electronic device 200 is similar to the electronic device 100, and more particularly the processor 201 is arranged for performing the same functions or steps as the processor CPU 101.

Figure 3:
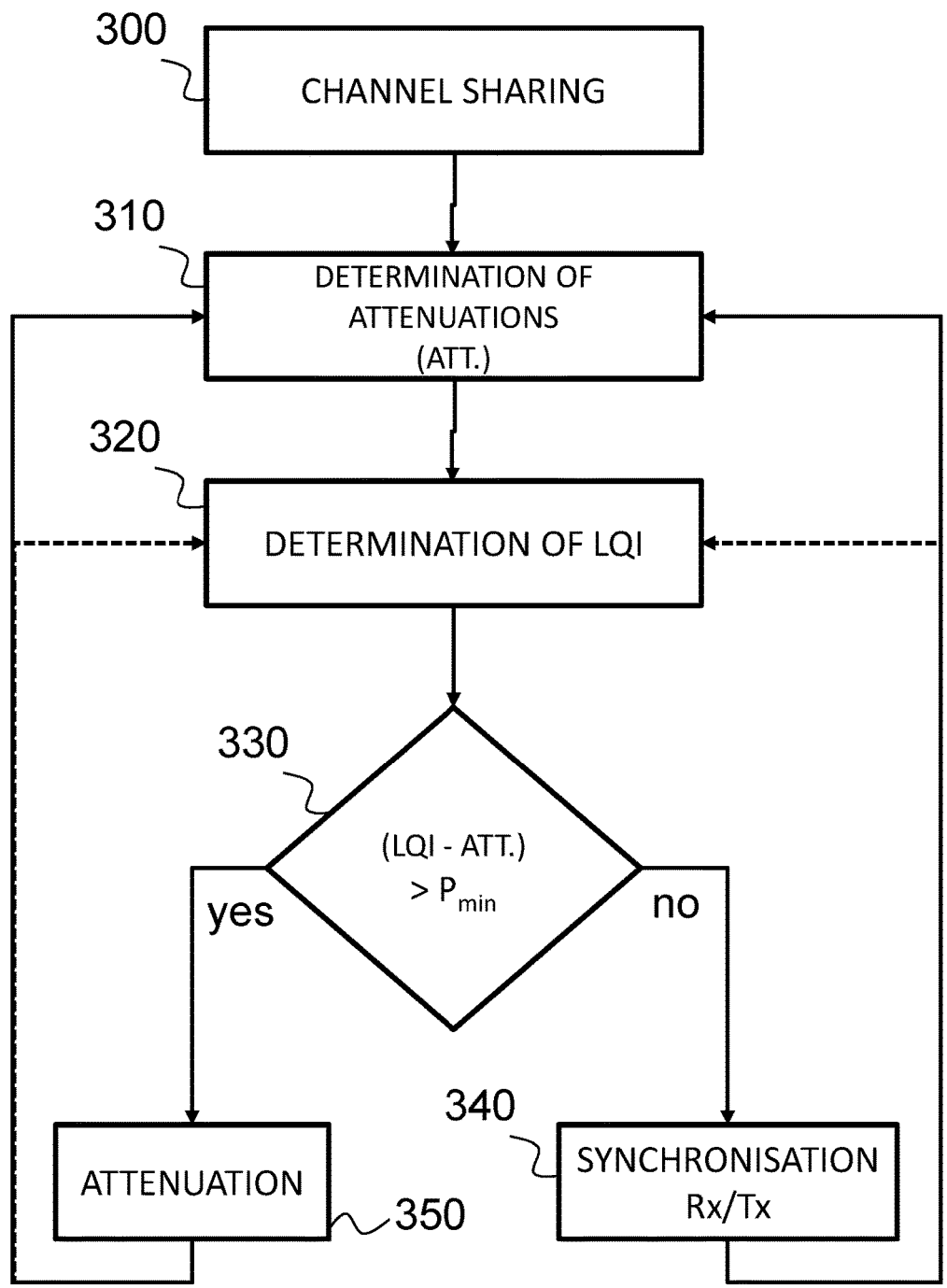
FIG. 3 illustrates schematically a method allowing the coexistence of a first radio module and a second radio module using the same frequency band in an electronic device according to one embodiment of the invention.

FIG. 3 illustrates schematically a method allowing the coexistence of a first radio module 110, 210 and a second radio module 111, 211 using the same frequency band in an electronic device 100, 200 according to one embodiment of the invention. For simplification, the method is described below for the case of an electronic device 100, but the method may be implemented in a similar fashion for the electronic device 200.

In a first step 300, which is optional, the electronic device 100 determines, for a radio module, a first list comprising at least one radio channel included in the frequency band, said radio module using solely a channel included in this first list in order to establish a radio communication. The electronic device 100 next determines, for the other radio module, a second list comprising at least one radio channel included in the frequency band and not included in the first list, said other radio module using solely a channel included in this second list in order to establish a radio communication. Thus each radio module uses different channels in the frequency band, which reduces the phenomena of interference between the two radio modules.

According to one embodiment, the step 300 may be implemented directly between the two radio modules 110 and 111, by modifying for example the operating software of the radio modules (firmware), the two radio modules communicating directly with one another. According to another embodiment, each radio module 110 and 111 is controlled by the processor CPU 101, said processor CPU 101 managing the communication between the two radio modules 110 and 111.

In the case where the first radio module 110 is in conformity with a Zigbee standard and a second radio module 111 is in conformity with a Bluetooth standard, step 300 is broken down thus:
 the Zigbee radio module 110 selects a channel from the channels of the frequency band, in accordance with a usual method as defined by the Zigbee standard,
 the "Frequency Agility" option of the Zigbee radio module 110 is possibly deactivated,
 the choice of the channel or channels is transmitted to the radio module 111, either directly by an exchange of messages between the two radio modules 110 and 111 or through the processor CPU 101,
 the Bluetooth radio module 111 separates the channel or channels chosen by the Zigbee radio module 110 from a so-called AFH (Adaptive Frequency Hopping) table (or list) from which the channels used by the Bluetooth radio module 111 for communicating are chosen.

In a second step 310, the processor CPU 101 determines, for each radio module 110 and 111, a value of an attenuation associated with the radio module, the value of the attenuation being determined according to a maximum power acceptable to said radio module, a maximum transmission power of the other radio module and an isolation between the first and second radio interfaces. The attenuation associated with a first radio module thus corresponds to an attenuation value making it possible to sufficiently attenuate a radio signal transmitted by the second radio module so as not to saturate the radio interface of the first radio module, the received power then being lower than the maximum power acceptable to the first radio module. This is because the isolation and attenuation make it possible to reduce the received power of the radio signal transmitted by the second radio module and received by the first radio module. This step 310 may be renewed periodically, in particular if the transmission power of a radio module is variable over time. Thus a new attenuation value associated with a first radio module can be determined whenever the transmission power of the second radio module changes, and conversely for a new attenuation value associated with the second radio module.

In a third step 320, the processor CPU 101 determines, for each radio module 110 and 111, a value of a quality indicator of a communication established with said radio module. The quality indicator typically corresponds to the parameter "LQI" (Link Quality Indicator) as defined in the standards IEEE 802.15.4, section 6.9.8 or IEEE 802.15.1, section 7.5.3. A prior calibration step can make it possible to associate, with each LQI value, a radio signal power received by a radio module 110 or 111. The quality indicator may directly represent a value of the radio signal power received by the radio module 110 or the radio module 111 during a communication established with another electronic device. A distinct quality indicator is determined for each radio module 110 and 111.

In a fourth step 330, the processor CPU 101 determines whether, for each radio module 110 or 111, the value of the quality indicator determined during step 320 for said radio module 110 or 111 is higher than a predetermined threshold value. The predetermined threshold value is dependent on the value of the attenuation associated with the radio module 110 or 111, determined during step 310, and a minimum power ($P_{min}$) acceptable to the radio module 110 or 111. In other words, the processor CPU 101 determines, for each radio module 110 and 111, whether the communication established with a radio module can be attenuated by a value corresponding to the value of the attenuation associated with said radio module without the communication established being cut since the power of the radio signal received corresponding to the communication established would become less than the minimum acceptable power. The minimum acceptable power of a radio module is the minimum power of a radio signal that a radio module can usefully receive. Below this minimum acceptable power, a communication cannot be established. In the positive case, that is to say if one of the values of the quality indicator is higher than a predetermined threshold value for the radio module 110 or the radio module 111, the processor next executes step 350, and in the contrary case step 340.

In step 340, the electronic device 100 synchronises the first radio module 110 and the second radio module 111 so that the first radio module 110 and the second radio module 111 are in reception phase or transmission phase at the same time. According to one embodiment of the invention, the synchronisation can be established by the processor CPU 101, which then controls the transmission and reception phases of the radio modules 110 and 111. According to another embodiment of the invention, the synchronisation can be obtained by exchanges of logic signals between the radio module 110 and the radio module 111, typically via a GPIO (General Purpose Input/Output) port present on each radio module. The processor CPU 101 is then not used for obtaining synchronisation. According to a complementary embodiment of the invention, the first radio module 110 is considered to be a so-called "master" module, the second radio module 110, referred to as "slave", synchronising on the transmission and reception phases of the first radio module 110. According to an alternative embodiment of the invention, the second radio module 111 is the so-called "master" radio module and the first radio module 110 is the so-called "slave" radio module. Following step 340, the method may comprise the execution of a new step 310, particularly if it is necessary to determine a new value of an attenuation following a change in transmission power of the radio module 110 or 111. Alternatively, following step 340, the method may comprise the execution of step 320 in order to take into account the change over time of the quality indicators of the communications established with the radio modules 110 and 111. The steps of the method are thus executed iteratively. In the case where it is necessary to adapt the method to the changes over time both of each quality indicator and of the transmission powers of the radio modules 110 and 111, step 340 is followed by step 310.

In step 350, the processor CPU 101 programmes the gain of the radio attenuator 120 or 121 placed on the interface of the radio module 110 or 111, the gain being chosen equal to the value of the attenuation associated with the radio module 110 or 111. In the case where only one of the values of the quality indicator is higher than a predetermined threshold value, for the radio module 110 or the radio module 111, then the value of the corresponding programmable-gain radio attenuator is programmed. The other programmable-gain radio attenuator is left by default (before programming) at the zero value thereof, corresponding to nil attenuation ("passthrough" function, no attenuation). In other words, if, for the first radio module 110, the value of the quality indicator is higher than the predetermined threshold value, then the radio attenuator 110 is programmed with a gain equal to the value of the attenuation associated with the first radio module 110. The radio attenuator 121 is left in "passthrough" function, that is to say without any attenuation. And conversely, if, for the second radio module 111, the value of the quality indicator is higher than the predetermined threshold value. In the case where the value of the quality indicator is higher than the threshold value predetermined for each of the two radio modules 110 and 111, then the processor CPU 101 determines the radio module 110 and 111 that has the highest value of the connection quality indicator and programmes only the gain of the radio attenuator of said radio module 110 or 111. Advantageously, the radio modules 110 and 111 can then transmit or receive independently of one another. Each radio module 110 and 111 can therefore implement its own access method and maximise its use of the available bandwidth.

Following step 350, the method may comprise the execution of a new step 310, particularly if it is necessary to determine a new value of an attenuation following a change in transmission power of the radio module 110 or 111. Alternatively, following step 350, the method may comprise the execution of step 320 in order to take into account the change over time in the quality indicators of the communications established with the radio modules 110 and 111. The steps of the method are thus executed iteratively. In the case where it is necessary to adapt the method to the changes over time both in each quality indicator and in the transmission powers of the radio modules 110 and 111, step 350 is followed by step 310.

According to a preferential embodiment of the present invention, a programmable-gain radio attenuator used has by default a zero gain, that is to say the attenuation is zero (passthrough) before programming. In the contrary case, if the radio attenuator does not have a zero gain, the minimum gain of the radio attenuator is considered to be an additional isolation and is taken into account in the previously described method by being added to the isolation. Minimum gain means here the lowest attenuation of the radio attenuator in terms of absolute value of the attenuation.

The invention claimed is:
1. An electronic device comprising first and second radio modules using the same radio frequency band and comprising respectively a first and second radio interface, the electronic device comprising a first and second programmable-gain radio attenuator placed respectively on the first and second radio interfaces, the electronic device being arranged for:
  determining, for each radio module, a value of an attenuation associated with said radio module, the value of the attenuation being determined according to a maximum power acceptable to said radio module, a transmission power of the other radio module and isolation between the first and second radio interfaces,
  determining, for each radio module, a value of a quality indicator of a communication established with said radio module, and,
  when, for a radio module, the value of the quality indicator is higher than a predetermined threshold value, the predetermined threshold value being dependent on the value of the attenuation associated with the radio module and a minimum power acceptable to the radio module:
    programming the gain of the radio attenuator placed on the interface of the radio module, the gain being chosen equal to the value of the attenuation associated with the radio module.

2. The electronic device according to claim 1, the electronic device being arranged, when, for each radio module, the value of the quality indicator is higher than the predetermined threshold value:
   for determining the radio module having the highest value of the quality indicator of an established communication, and
   for programming the gain of the radio attenuator of said radio module.

3. The electronic device according to claim 1, the electronic device being further arranged for:
   determining, for a radio module, a first list comprising at least one radio channel included in the frequency band, said radio module using only a channel included in this first list for establishing a radio communication,
   determining, for the other radio module, a second list comprising at least one radio channel included in the frequency band and not included in the first list, said other radio module using solely a channel included in this second list for establishing a radio communication.

4. The electronic device according to claim 1, the electronic device being arranged, when, for each radio module, the value of the quality indicator is lower than the predetermined threshold value:
   for synchronising the first and second radio modules so that the first and second radio modules are in reception or transmission phase at the same time.

5. The electronic device according to claim 1, the electronic device comprises a radio comprising an input connected to an antenna and two outputs connected respectively to the first and second programmable-gain radio attenuators.

6. The electronic device according to claim 1, the electronic device comprising first and second antennas, the first and respectively second programmable-gain radio attenuators placed on the first and respectively second radio interfaces being connected to the first and respectively second antennas.

7. The electronic device according to claim 1, the first radio module being in conformity with a Bluetooth standard and the second radio module being in conformity with a Zigbee standard.

8. A method allowing the coexistence of first and second radio modules using the same frequency band in an electronic device, the first and second radio modules comprising respectively a first and second radio interface, the electronic device comprising a first and second programmable-gain radio attenuator placed respectively on the first and second radio interfaces, the electronic device comprising a processor, the method being executed by the processor causing the device to perform:
   determining, for each radio module, a value of an attenuation associated with said radio module, the value of the attenuation being determined according to a maximum power acceptable to said radio module, a maximum transmission power of the other radio module and an isolation between the first and second radio interfaces,
   determining, for each radio module, a value of a quality indicator of a communication established with said radio module, and,
   when, for a radio module, the value of the quality indicator is higher than a predetermined threshold value, the predetermined threshold value being dependent on the value of the attenuation associated with the radio module and a minimum power acceptable to the radio module:
   programming the gain of the radio attenuator placed on the interface of the radio module, the gain being chosen equal to the attenuation value associated with the radio module.

9. The method according to claim 8, the method causing the device to perform the following prior steps:
   determining, for a radio module, a first list comprising at least one radio channel included in the frequency band, said radio module using solely a channel included in this first list for establishing a radio communication,
   determining, for the other radio module, a second list comprising at least one radio channel included in the frequency band and not included in the first list, said other radio module using solely a channel included in this second list for establishing a radio communication.

10. A non-transitory computer program product comprising instructions for the implementation, by a processor, of the method allowing the coexistence of first and second radio modules using the same frequency band in an electronic device according to claim 8, when said computer program is executed by said processor.

11. A non-transitory information storage medium comprising a computer program according to claim 10.

* * * * *